US006195602B1

(12) United States Patent
Hazama et al.

(10) Patent No.: US 6,195,602 B1
(45) Date of Patent: Feb. 27, 2001

(54) VEHICLE COMMUNICATION SYSTEM AND METHOD FOR VEHICLES CAPABLE OF AUTOMATIC STORING OF VEHICLE IDENTIFICATION CODE

(75) Inventors: Koji Hazama, Kariya; Hajime Nomura, Okazaki; Masakatsu Shigyo, Anjo; Minoru Hozuka, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/229,752

(22) Filed: Jan. 14, 1999

(30) Foreign Application Priority Data

Mar. 10, 1998 (JP) ........................................ 10-058562

(51) Int. Cl.[7] ........................ G06F 17/00; G06F 7/00

(52) U.S. Cl. ........................ 701/48; 701/33; 701/35; 701/36

(58) Field of Search ........................ 701/1, 32, 35, 701/36, 48, 53, 33; 340/853.2

(56) References Cited

U.S. PATENT DOCUMENTS 5,189,617 * 2/1993 Shiraishi ........................ 701/48
5,422,473 * 6/1995 Kamata ........................ 235/384
5,583,765 * 12/1996 Kleehammer ........................ 701/1
5,699,250 * 12/1997 Kobayashi ........................ 701/48
6,067,495 * 5/2000 Fliearman et al. ........................ 701/55
6,067,516 * 5/2000 Levay et al. ........................ 704/244

FOREIGN PATENT DOCUMENTS 5-332888 12/1993 (JP) .
7-93676 4/1995 (JP) .

* cited by examiner

*Primary Examiner*—William A. Cuchlinski, Jr.
*Assistant Examiner*—Gertrude Arthur
(74) *Attorney, Agent, or Firm*—Nixon & Vanderhye P.C.

(57) ABSTRACT

A plurality of electronic control units such as engine ECU, navigation ECU and meter ECU as well as a transponder unit is provided in a vehicle so that those control units communicate with each other through a communication line. Each unit stores therein a vehicle identification code which varies from vehicle to vehicle. Each unit checks whether the vehicle identification code is stored in response to a turn-on of power supply. One control unit which does not store the vehicle identification code, it requests a transmission of the vehicle identification code stored in other control units of the vehicle. The other control units responsively transmit the respective stored vehicle identification code to the one control unit. The one control unit, receiving the vehicle identification code writes the transmitted vehicle identification code into its non-volatile memory. Each unit not only controls a vehicle-mounted device, but also diagnoses the vehicle-mounted device. The diagnosis result is transmitted from the transponder unit to an external management station through a radio communication together with the stored vehicle identification code, so that the management station may determine to which a repair instruction should be issued.

16 Claims, 7 Drawing Sheets

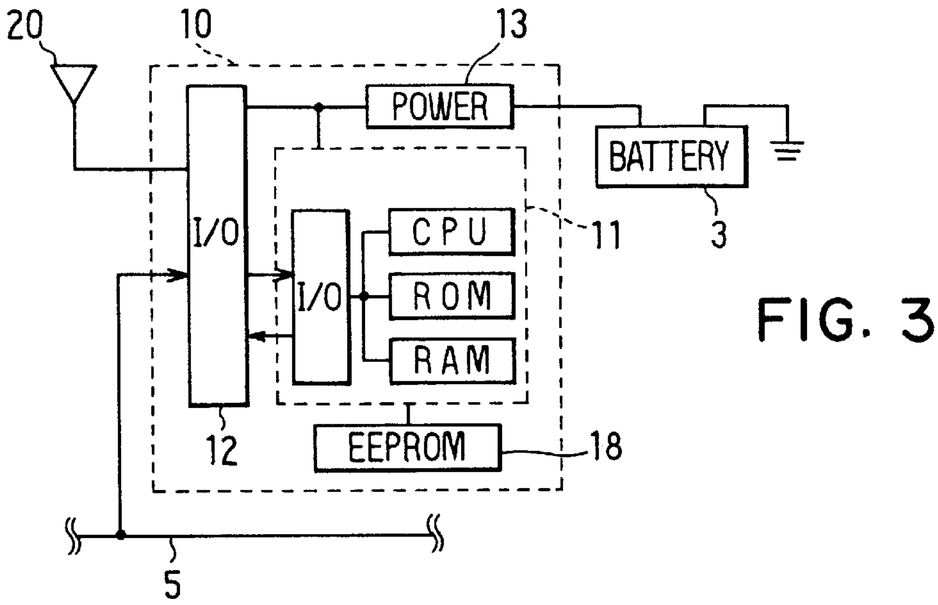
FIG. 3
FIG. 4
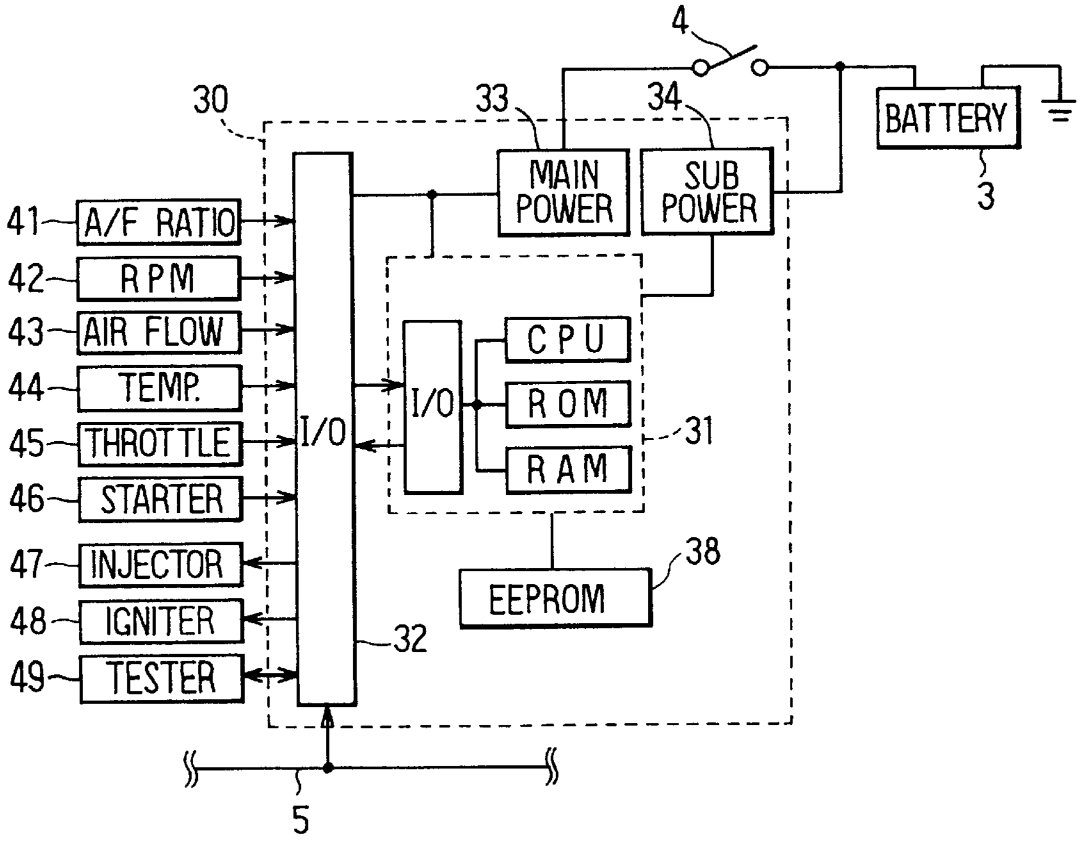

VEHICLE COMMUNICATION SYSTEM AND METHOD FOR VEHICLES CAPABLE OF AUTOMATIC STORING OF VEHICLE IDENTIFICATION CODE

CROSS REFERENCE TO RELATED APPLICATION

This application relates to and incorporates herein by reference Japanese Patent Application No. 10-58562 filed on Mar. 10, 1998.

BACKGROUND OF THE INVENTION

1. Field of the Invention

The present invention relates to a system and method capable of automatically storing a vehicle identification code among electronic control units in each vehicle and, more particularly, to a system and method for communicating vehicle information along with the vehicle identification code with an external management station through a radio signal.

2. Related Art

It is known to transmit vehicle information such as a vehicle inspection result (diagnosis information regarding an abnormality in an engine-related devices) on the vehicle side from the vehicle to a management station via a radio signal communication. The management station is thus enabled to instruct the user of the vehicle to repair the vehicle in response to the received vehicle inspection result.

In this type of centralized system, each vehicle is required to transmit the inspection result along with a vehicle identification code, which specifies the vehicle. As this code must be set to differ from vehicle to vehicle, it is stored in a non-volatile memory of an electronic control unit (ECU) such as an engine ECU of each vehicle when the ECU is mounted on the vehicle.

In the event that the ECU has to be replaced by a new one because of failure or malfunction, for instance, it is necessary to check the vehicle identification code stored in the non-volatile memory of the old ECU and to store it again in a non-volatile memory of the new ECU.

SUMMARY OF THE INVENTION

It is therefore an object of the invention to provide a communication system for a vehicle, in which a vehicle identification code is automatically stored even when an old ECU is to be replaced by a new ECU.

According to the present invention, a plurality of electronic control units is provided in a vehicle so that the control units communicate with each other through a communication line. Each control unit stores therein a vehicle identification code which varies from vehicle to vehicle. Each control unit checks whether the vehicle identification code is stored in response to a turn-on of power supply. If one control unit does not store the vehicle identification code, it requests a transmission of the vehicle identification code stored in other control units of the vehicle. The other control units responsively transmit the respective stored vehicle identification code to the one control unit. The one control unit which receives the vehicle identification code writes the transmitted vehicle identification code into its non-volatile memory.

Preferably, each control unit not only controls a vehicle-mounted device, but also diagnoses the vehicle-mounted device. The diagnosis result is transmitted to an external management station through a radio communication together with the stored vehicle identification code, so that the management station may determine what a repair instruction should be issued.

BRIEF DESCRIPTION OF THE DRAWINGS

Other objects, features and advantages of the present invention will become apparent from the following detailed description made with reference to the accompanying drawings. In the drawings:

FIG. 3 is a block diagram showing the construction of a transponder unit in the embodiment;

FIG. 4 is a block diagram showing the construction of an engine ECU in the embodiment;

DETAILED DESCRIPTION OF THE PREFERRED EMBODIMENT

Figure 1:
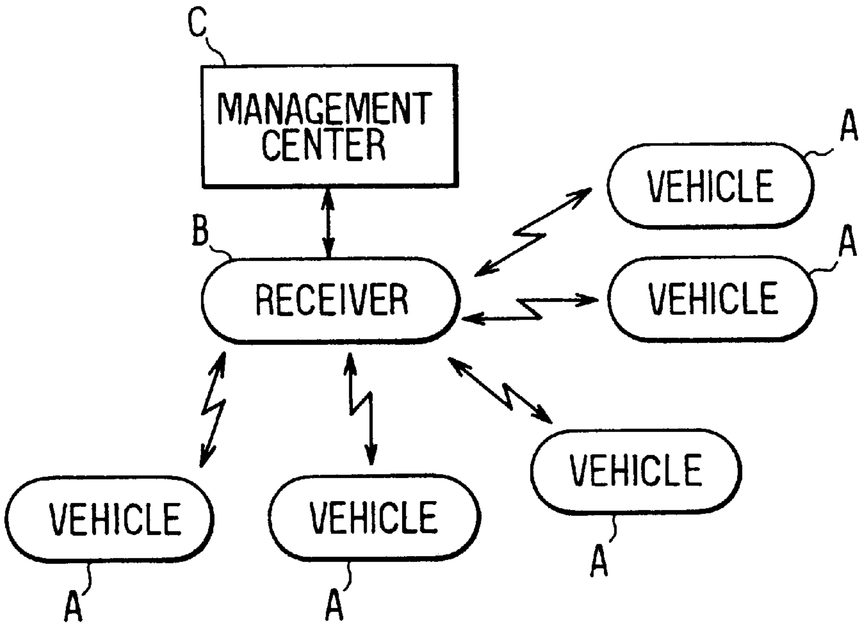
FIG. 1 is a schematic diagram of a diagnosis system including vehicles each having a vehicle diagnosis apparatus according to an embodiment of the present invention.

In FIG. 1, a management station C serving as a central competent authority acquires data related to emission (exhaust gas) data regarding an abnormality in an engine, and the like from each of a plurality of vehicles A via a receiver B by a radio signal communication. The management station C specifies the vehicle A having the malfunction and demands the user of the vehicle A to repair or improve a device causing the malfunction. Various methods such as mailing of a document can be used to demand the repair or improvement.

Figure 2:
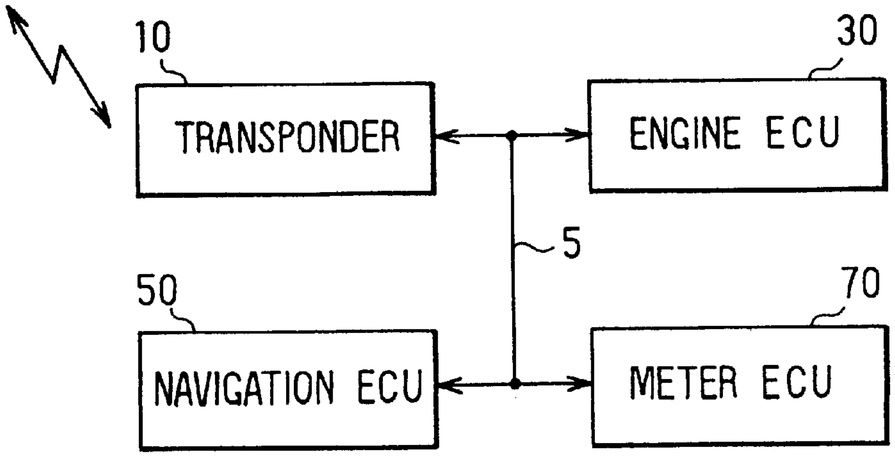
FIG. 2 is a block diagram showing a schematic system construction of the vehicle in the embodiment.

As shown in FIG. 2, in each vehicle A, a transponder unit 10 receives a request from the receiver B, acquires necessary information via a communication line 5 from an engine ECU 30, a navigation ECU 50, and a meter ECU 70 serving as electronic control units mounted on the vehicle A and transmits the acquired information to the receiver B (FIG. 1).

The engine ECU 30 controls the engine, self-diagnoses an abnormality relating to the exhaust emission of the engine, and transmits the information to the transponder unit 10 in response to the request from the transponder unit 10. The navigation ECU 50 and the meter ECU 70 carry out a navigation control and a meter display control, respectively. When the engine ECU 30 detects an abnormality by the self-diagnosis, the navigation ECU 50 and the meter ECU 70 output a travel distance of the vehicle A and the position of the vehicle A to the engine ECU 30 in response to requests sent from the engine ECU 30, respectively. When the request from the transponder unit 10 is received, the ECUs 50, 70 output the travel distance and the vehicle position at that time point to the transponder unit 10.

In the transponder unit 10 shown in FIG. 3, since the electric power is always supplied from a battery 3 to a power circuit 13 for supplying the electric power to operate the transponder unit 10, the transponder unit 10 operates irrespective of the state of a key switch (not shown) of the vehicle A. A CPU in a microcomputer 11 executes a processing in response to a request sent from the outside via an antenna 20 in accordance with a control program stored in a ROM in the microcomputer 11. A RAM in the microcomputer 11 temporarily stores data and the like sent from the engine ECU 30 and so on. An input/output circuit 12 is connected to the antenna 20 and the communication line 5. Data inputted and outputted via the input/output circuit 12 is received and transmitted from/to the CPU and the like via an I/O device in the microcomputer 11. The microcomputer 11 is connected to an EEPROM 18 which stores therein a vehicle identification code (VIN code).

In the engine ECU 30 shown in FIG. 4, a main power circuit 33 is connected to the battery 3 via an ignition switch 4 (ignition position of the key switch). Basically, by turning on the ignition switch 4, the power is supplied from the main power circuit 33 and the engine ECU 30 operates. A power is also supplied from a sub power circuit 34 which is directly connected to the battery 3 not through the ignition switch 4, so that data in a RAM in a microcomputer 31 is held even after turn-off of the ignition switch 4.

In the microcomputer 31, according to the control program stored in the ROM, a CPU generates signals for controlling an injector 47 and an igniter 48 so that the engine operates optimally on the basis of sensor signals inputted via an input/output circuit 32 and an I/O device in the microcomputer 31. The microcomputer 31 self-diagnoses abnormality relating to exhaust emission of the engine, operation of the engine, and abnormality or the like occurring in sensors 41 to 46. Data of the diagnosis result is outputted in response to the request from the outside (a DIAG tester 49 or the transponder unit 10). The RAM in the microcomputer 31 holds sensor data used for an arithmetic operation in the CPU, control data acquired by the arithmetic operation, various diagnosis data derived by the diagnosis, and the like. The microcomputer 31 is connected to an EEPROM 38 which stores the VIN code.

The sensors 41 to 46 connected to the input/output circuit 32 are the air-fuel ratio (A/F) sensor 41, revolution sensor 42 for sensing the rotational speed (RPM) of the engine, air flow meter 43, coolant temperature sensor 44, throttle sensor 45, and starter switch 46.

Figure 5:
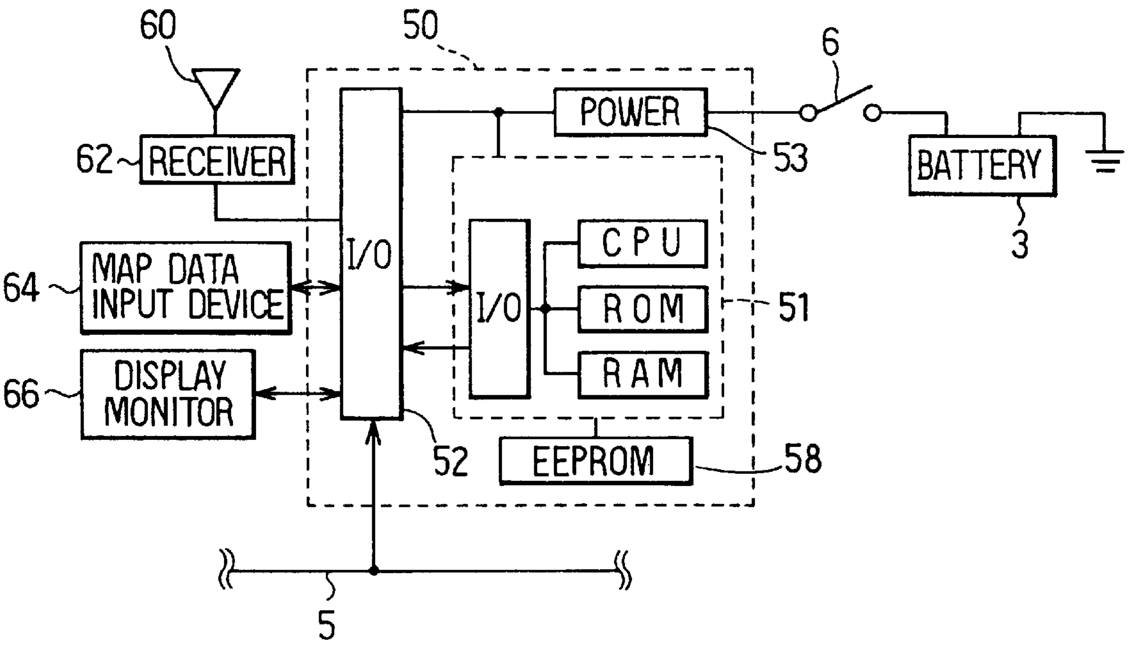
FIG. 5 is a block diagram showing the construction of a navigation ECU in the embodiment.

In the navigation ECU 50 shown in FIG. 5, a power circuit 53 is connected to the battery 3 via an accessory switch 6 (accessory position of the key switch) and a microcomputer 51 and an input/output circuit 52 operate when the accessory switch 6 is turned on. A receiver 62, a map data input device 64, and a display monitor 66 are connected to the input/output circuit 52. A GPS antenna 60 is connected to the receiver 62. Those components construct a GPS (Global Positioning System) for detecting the position of the vehicle A on the basis of electromagnetic waves from a GPS satellite. The map data inputting device 64 is a device for inputting various data including map matching data to improve the accuracy of position detection and map data from a storage medium. As a storage medium for this use, although it is typical to use a CD-ROM because of a large data amount, other media such as DVD and memory card can be also employed. The display monitor 66 is used to display a map, a guiding path, and the like in the vehicle A. The display monitor 66 also has the function of receiving an instruction from the user.

In the microcomputer 51, in accordance with the control program stored in a ROM, a CPU executes a displaying processing in response to instruction from the user acquired through the display monitor 66 on the basis of map data from the map data input device 64 and a signal from the receiver 62 inputted via the input/output circuit 52 and an I/O device in the microcomputer 51 and allows the display monitor 66 to display desired information of the user. When the request from the engine ECU 30 or the transponder unit 10 is received via the communication line 5, the microcomputer 51 can output the vehicle position at the time of receipt of the request to the engine ECU 30 or transponder unit 10 which sent the request. The microcomputer 51 is connected to an EEPROM 58 which stores therein the VIN code.

Figure 6:
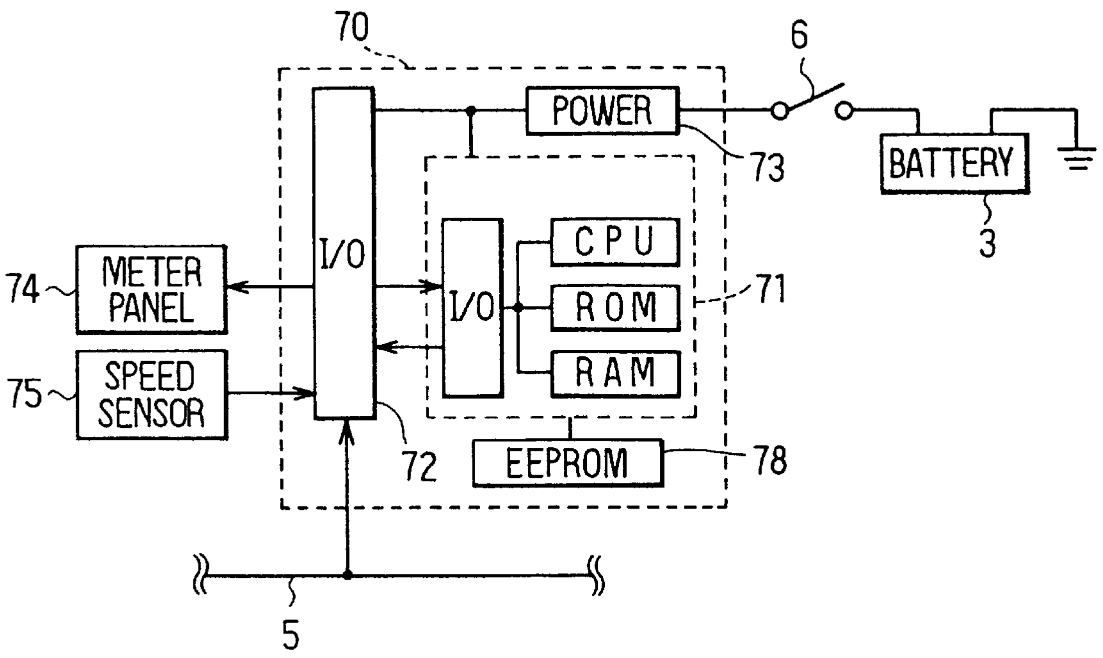
FIG. 6 is a block diagram showing the construction of a meter ECU in the embodiment.

In the meter ECU 70 shown in FIG. 6, a power circuit 73 is connected to the battery 3 via the accessory switch 6. When the accessory switch 6 is turned on, a microcomputer 71 and an input/output circuit 72 operate. A meter panel 74, a speed sensor 75, and the like are connected to the input/output circuit 72.

In the microcomputer 71, in accordance with the control program stored in a ROM, the CPU receives a sensor signal from the speed sensor 75 and the like and allows the meter panel 74 to display information such as the speed of the vehicle. When the request from the engine ECU 30 or the transponder unit 10 is received via the communication line 5, the microcomputer 71 can output a cumulative travel distance of the vehicle at the time of the receipt of the request to the engine ECU 30 or transponder unit 10 which sent the request. The microcomputer 71 is connected to an EEPROM 78 which stores therein the VIN code.

In the above system, the ECUs 30, 50, 70 self-diagnose respective related devises in each vehicle A so that the diagnosis result (diagnosis information) is transmitted through the communication line 5 to the transponder unit 10, which in turn transmits it to the external management center C through the receiver B. The diagnosis information also includes engine operating condition data (freeze frame data) such as engine rotation speed, air flow amount, fuel injection amount, ignition timing, vehicle travel distance and vehicle position, so that those data may be used to analyze the diagnosis information at the management center C. The vehicle travel distance and the vehicle position are transmitted to the engine ECU 30 from the meter ECU 70 and the navigation ECU 50 through the communication line 5, respectively, upon request from the engine ECU 30 transmitted through the communication line 5.

The VIN code, which is assigned to differ from vehicle to vehicle for vehicle identification, is transmitted to the receiver B along with the diagnosis information, so that the management center C is enabled to identify the vehicle which transmitted the diagnosis information. Even if only the transponder unit 10 stores therein the VIN code in each vehicle A, the diagnosis information can be transmitted along with the VIN code. However, if the transponder unit is replaced by a new one because of its failure, the VIN code cannot be transmitted along with the diagnosis information by the new transponder unit.

Therefore, in this embodiment, the transponder unit 10, engine ECU 30, navigation ECU 50, meter ECU 70 stores in respective EEPROMs 18, 38, 58, 78 the same VIN code specific to each vehicle A. As a result, even if one of the units 10, 30, 50, 70 loses the VIN code, it can be stored again automatically from another one of the units 10, 30, 50, 70. Although the VIN code is not stored at the time the units 10, 30, 50, 70 are supplied from the respective manufacturers, it is stored or written into the units at the time each vehicle A is manufactured by a vehicle manufacturer which assigns an identification code to each vehicle. Thus, all the units 10, 30, 50, 70 in each vehicle stores the same VIN code in the respective EEPROMs 18, 38, 58, 78.

If one of the units 10, 30, 50, 70 is to be replaced by a new unit, no VIN code is stored in its EEPROM. Therefore, the new unit requests and receives from the other units the VIN code in each vehicle in the following manner. It is to be noted that each microcomputers 11, 31, 51, 71 of the units 10, 30, 50, 70 are programmed to execute the following processing. This processing is explained with reference to the case of the engine ECU 30.

Figure 7:
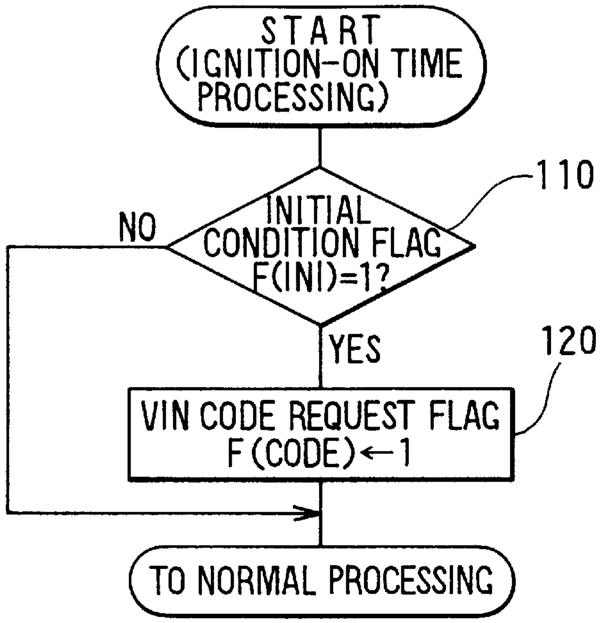
FIG. 7 is a flow diagram showing an ignition-on time processing executed by the engine ECU in the embodiment.

The engine ECU 30, particularly the microcomputer 31, first executes the ignition-on time processing shown in FIG. 7, when the ignition switch 4 is turned on. At step 110, it checks whether the present condition is an initial condition. Here, the initial condition means that no VIN code is kept stored in the EEPROM 38 and an initial condition flag F(INI) is 1. In normal practice, this initial condition flag F(INI) is set to 1 when the ECU is supplied from an ECU manufacturer, and is reset to 0 when a vehicle manufacturer assigns the VIN code. However, if this ECU is replaced by a new one at a repair shop, etc., other than the vehicle manufacturer, the new ECU does not have the VIN code in its EEPROM 38.

If it is the initial condition (YES at step 110), the processing proceeds to step 120 to set a VIN code request flag F(CODE) to 1, returning to the normal processing. The VIN code request flag F(CODE) is used to determine whether the VIN code is to be requested from other ECUs. If it is not the initial condition (NO at step 110), the processing proceeds to the normal processing without executing step 120.

Figure 8:
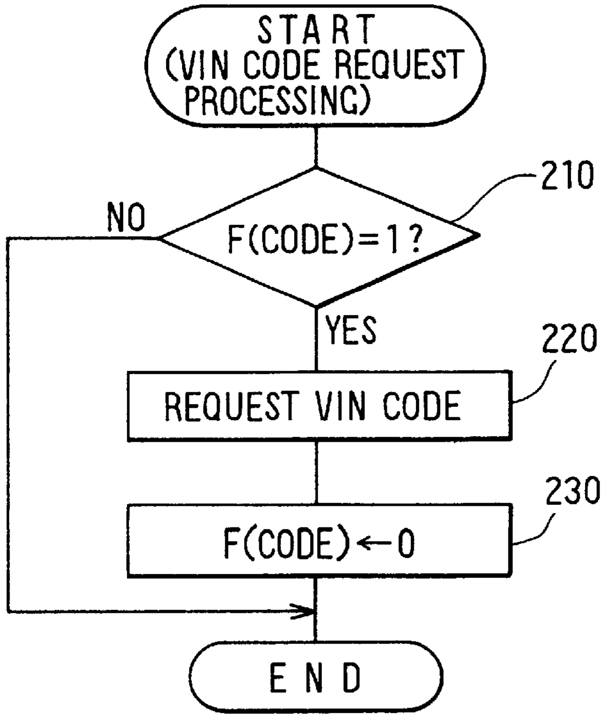
FIG. 8 is a flow diagram showing a VIN code request processing executed by the engine ECU in the embodiment.

In the VIN code request processing which is executed every 64 ms, as shown in FIG. 8, it is checked at step 210 whether the VIN code request flag F(CODE) is 1. If it is 1 (YES), the ECU 30 requests the VIN code from the other units 10, 50, 70 in the vehicle through the communication line 5. At step 230 after this request, the VIN code request flag F(CODE) is reset to 0. If the VIN code request flag F(CODE) is not 1 (NO at step 210), on the other hand, the processing ends.

Figure 9:
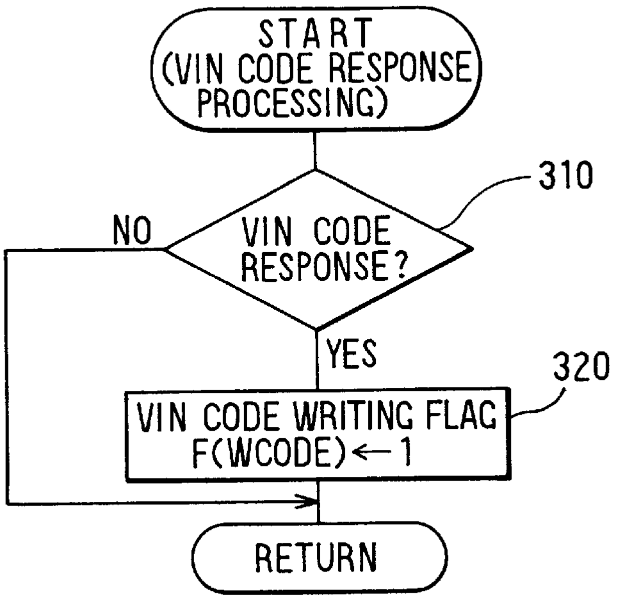
FIG. 9 is a flow diagram showing a code response processing executed by the engine ECU in the embodiment.

The ECU 30 further executes a VIN code response processing shown in FIG. 9 as an interrupt processing upon receipt of a signal from the other units 10, 50, 70. At step 310, it is checked whether the received signal is the response of VIN code request issued in step 220 (FIG. 8). If it is the VIN code response (YES at step 310), a VIN code writing flag F(WCODE) is reset to 1. If it is not the VIN code response (NO at step 310), the processing ends.

Figure 10:
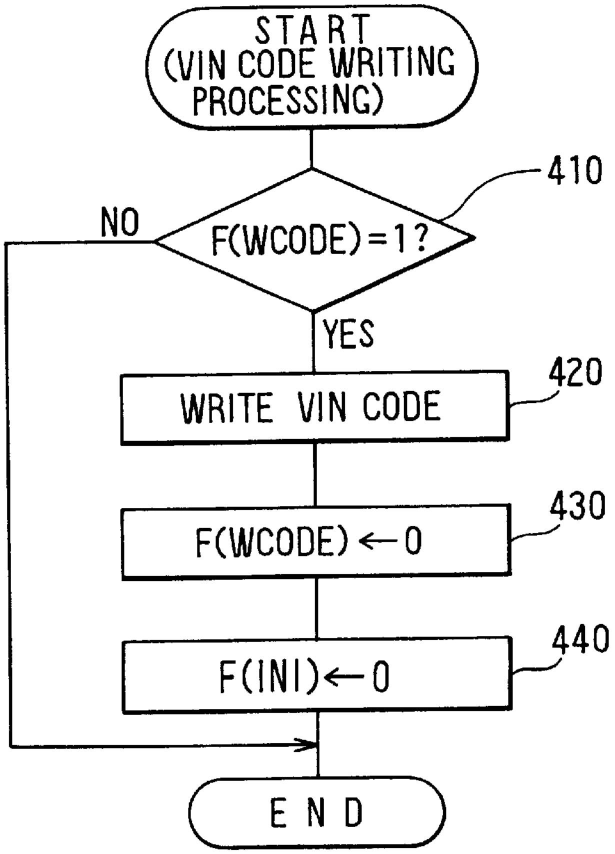
FIG. 10 is a flow diagram showing a VIN code writing processing executed by the engine ECU in the embodiment.

In the VIN code writing processing which is executed every 64 ms, as shown in FIG. 10, it is checked whether the VIN code writing flag F(WCODE) is 1. If the flag F(WCODE) is not 1 (NO in step 410), the processing ends. If it is 1 (YES in step 410), the received VIN code is written and stored in the EEPROM 38. After this writing, a VIN code writing flag F(WCODE) is reset to 0 at step 430 to indicate completion of an automatic VIN code writing.

At the following step 440, the initial condition flag F(INI) is reset to 0 to indicate that the VIN code is kept stored in the engine ECU 30. Thus, when the ignition switch 4 is turned on next time, no more VIN code request is issued at step 220 (FIG. 8) because the check result at steps 110 (FIG. 8) and 210 (FIG. 8) results in NO.

Figure 11:
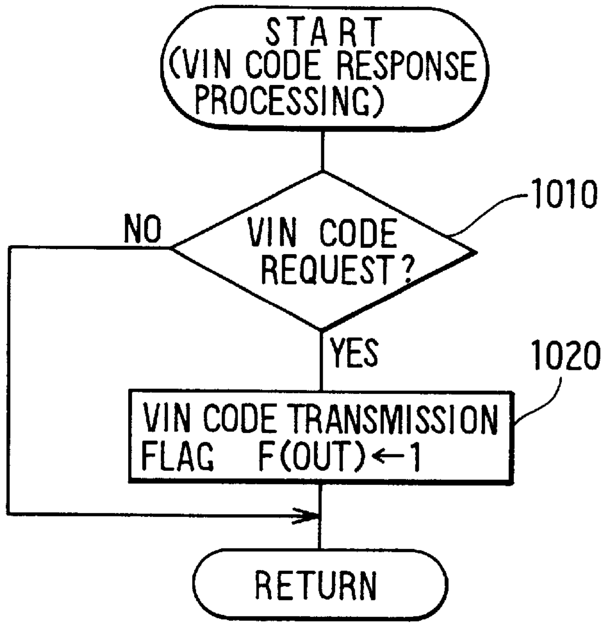
FIG. 11 is a flow diagram showing a response processing executed by the engine ECU in the embodiment.
Figure 12:
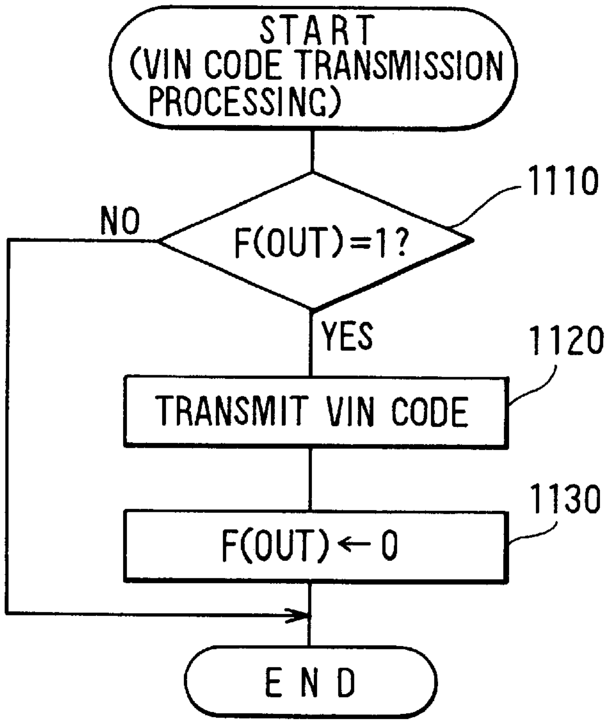
FIG. 12 is a flow diagram showing a VIN code transmission processing executed by the engine ECU in the embodiment.

The processing in the units 10, 50, 70, to which the engine ECU 30 issued the VIN code request, are shown in FIGS. 11 and 12.

The processing shown in FIG. 11 is an interrupt routine executed as a VIN code response processing upon receipt of the request from the engine ECU 30. At step 1010, it is checked first whether a received request is the request of the VIN code. If it is the VIN code request (YES at step 1010), a VIN code transmission flag F(OUT) is set to 1 at step 1020. If it is not the VIN code request (NO at step 1010), the processing ends.

The processing shown in FIG. 12 is executed as a VIN code transmission processing. At step 1110, it is checked whether the VIN code transmission flag F(OUT) is 1. If it is not 1 (NO at step 1110), the processing ends. If it is 1 (YES), on the other hand, the VIN code stored in the EEPROM is read out and transmitted at step 1120 from the engine ECU 30 through the communication line 5. At the following step 1130, the VIN code transmission flag F(OUT) is reset to 0.

Thus, in this embodiment, even when one of the units 10, 30, 50, 70 is replaced by a new unit because of its failure, the new unit receives the VIN code from the other units in the vehicle A and stores it in the new EEPROM automatically in response to the turn-on of the ignition switch 4 after the replacement of the unit. Further, as the VIN code is requested from one unit to the other units and is transmitted from the other units, the VIN code may be stored only in one unit at the time of manufacturing each vehicle so that the VIN code is written and stored in the other units automatically in response to the turn-on of the ignition switch 4. This automatic processing of requesting, transmitting and storing the VIN code reduces a VIN code writing work at the time of vehicle manufacturing.

It is to be noted in the above embodiment that the above automatic processing is possible as long as genuine units are used because each unit has the same VIN code specifically assigned to the vehicle A. However, if an inappropriate unit having no or different VIN code is used for some reason, it will occur that the incorrect VIN code is written. Therefore, it is preferred to check whether all the units are genuine parts by the use of the VIN code. In this embodiment, it is possible to determine the inappropriate unit by comparing in each unit its VIN code with other VIN codes received from the other unit. As four units 10, 30, 50, 70 are used in each vehicle A, one unit is determined to be inappropriate if its VIN code does not coincide with the majority (at least 2) of VIN codes of the other three units.

Figure 13:
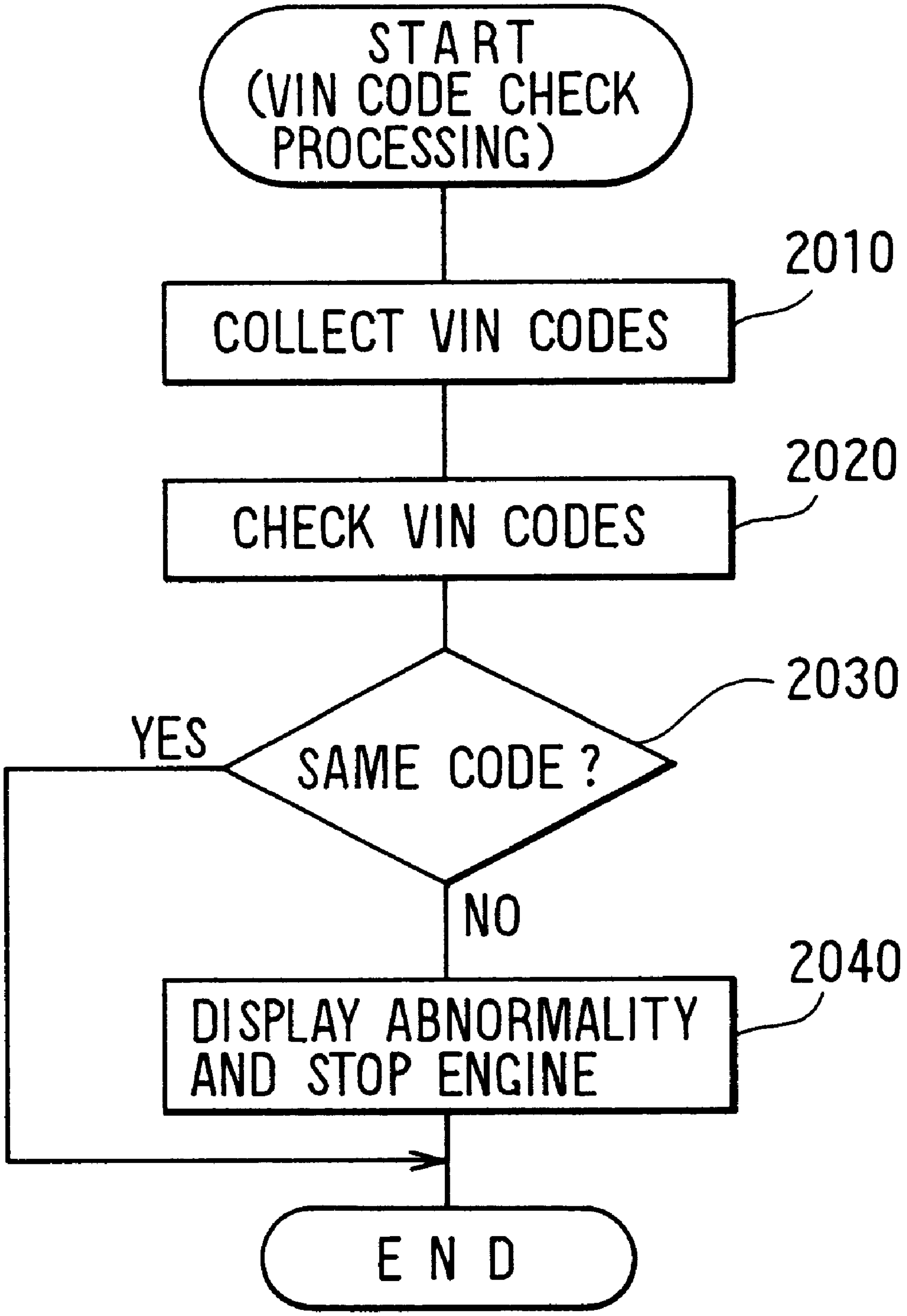
FIG. 13 is a flow diagram showing a VIN code checking processing executed by the engine ECU in the embodiment.

This VIN code check processing to be executed in each of the units 10, 30, 50, 70 is shown in FIG. 13. First at step 2010, all the VIN codes of the other units are collected through the communication line 5. That is, if one unit issues a VIN code request to the other units, the other units responsively transmits respective VIN codes to the one unit.

At the following step 2020, the collected VIN codes are checked to determine the majority of the collected VIN codes as a reference VIN code. Then at step 2030, the VIN code of the one unit is compared with the reference VIN code. If the VIN codes are the same (YES at step 2030), the processing ends. If not (NO), however, the processing proceeds to step 2040 which issues an alarm indicating that the one unit is an inappropriate one. Additionally or alternatively, the engine of the vehicle A may be disabled to operate.

The above embodiment should not be limited to a vehicle information communication system but may be modified. For instance, when the control programs of the microcomputers 11, 31, 51, 71 are to be changed partly to match with required specifications which vary among vehicle types, the control programs are changed. This control program change can be effected assuredly by determining the vehicle types with reference to the VIN codes before changing or rewriting the control programs. As long as the VIN code is stored in each unit, it is unnecessary to request and receive the VIN code from the other units.

Further, the present invention may be implemented in many other ways without departing from the spirit of the invention.

What is claimed is:

1. A communication system for a vehicle having a plurality of electronic control units which communicate with each other through a communication line, each of the control units for a particular vehicle comprising:

storage means for storing therein vehicle identification information which is specific to said particular vehicle;

information request means for requesting transmission of the vehicle identification information stored in another control unit of the vehicle when the vehicle identification information is not stored in the storage means;

information response means for reading and transmitting the stored vehicle identification information to another control unit when a request for transmission of the vehicle identification information is received from said another control unit; and information writing means for writing received vehicle identification information into the storage means when vehicle identification information is transmitted from another control unit and received in response to a request for transmission of vehicle identification information.

2. A communication system as in claim 1, wherein at least one of the control units includes:

a device control unit for controlling and diagnosing a vehicle-mounted device; and a communication control unit for transmitting to an external management station a diagnosis result of the device control unit together with the stored vehicle identification information.

3. A communication system as in claim 1, wherein:

the information request means is for checking for presence and absence of vehicle identification information in the storage means in response to supply of electric power, and for requesting transmission of vehicle identification information from another control unit when the vehicle identification information is absent.

4. A communication system as in claim 1, wherein:

the storage means is a non-volatile memory.

5. A communication system as in claim 1, wherein:

the number of control units is at least three; and each of the control units further comprises check means for checking whether the therein stored vehicle identification information is the same as a majority of the vehicle identification information stored in other control units, and for executing predetermined abnormality processing when the checked vehicle identification information is different from the majority of the vehicle identification information stored in other control units.

6. A communication system as in claim 5, wherein:

the predetermined abnormality processing includes producing an alarm of abnormality.

7. A communication system as in claim 5, wherein:

the predetermined abnormality processing includes disabling operation of a vehicle-mounted device.

8. An electronic control unit for a communication system of a vehicle which unit communicates with at least one other electronic control unit through a communication line, the control unit comprising:

storage means for storing therein vehicle identification information which is specific to said vehicle;

information request means for requesting transmission of the vehicle identification information stored in at least one other control unit of the vehicle when the vehicle identification information is not stored in the storage means;

information response means for reading and transmitting stored vehicle identification information to another control unit when a request for transmission of the vehicle identification is received from another control unit; and information writing means for writing received vehicle identification information into the storage means when vehicle identification information is transmitted from another control unit in response to a request for transmission of the vehicle identification information from another control unit.

9. A control unit as in claim 8, wherein:

the information request means includes checking for presence and absence of vehicle identification information in the storage means in response to supply of electric power, and for requesting transmission of vehicle identification information from another control unit when the vehicle identification information is absent.

10. A control unit as in claim 8, wherein:

the storage means is a non-volatile memory.

11. A control unit as in claim 8, further comprising:

check means for checking whether the stored vehicle identification information is the same as a majority of vehicle identification information stored in other control units, and for executing predetermined abnormality processing when the checked vehicle identification information is different from the majority of vehicle identification information stored in other control units.

12. A control unit as in claim 11, wherein:

the predetermined abnormality processing includes generating an alarm of abnormality.

13. A control unit as in claim 11, wherein:

the predetermined abnormality processing includes causing a restriction to operation of a vehicle-mounted device.

14. A communication method for a vehicle having a plurality of electronic control units which communicate with each other through a communication line and storing respectively a vehicle identification code specific to said vehicle, the method comprising:

checking in each of the control units whether the vehicle identification code is stored in response to a turn-on of a power supply;

requesting, from one control unit which is devoid of the vehicle identification code, transmission of the vehicle identification code stored in another control unit of the vehicle;

transmitting stored vehicle identification code from another control unit in response to the request for transmission of the vehicle identification code; and writing the transmitted vehicle identification code into the control unit which requested and received the transmission of the vehicle identification code.

15. A communication method as in claim 14, further comprising:

diagnosing a vehicle-mounted device by at least one of the control units; and transmitting to an external management station through radio communication diagnosis results of at least one of the control units together with the stored vehicle identification code.

16. A communication system as in claim 14, further comprising:

collecting by one control unit the vehicle identification codes stored in other control units;

determining a reference identification code which is the same as a majority of the collected vehicle identification codes; and checking whether the stored vehicle identification code in the one control unit is the same as the reference identification code thereby to determine appropriateness of the vehicle identification code stored in the one control unit.

* * * * *